(12) United States Patent
Bandholz

(10) Patent No.: US 8,677,211 B2
(45) Date of Patent: Mar. 18, 2014

(54) DATA BUS INVERSION USING SPARE ERROR CORRECTION BITS

(75) Inventor: Justin P. Bandholz, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 694 days.

(21) Appl. No.: 12/977,420

(22) Filed: Dec. 23, 2010

(65) Prior Publication Data

US 2012/0166904 A1    Jun. 28, 2012

(51) Int. Cl.
    *G11C 29/00* (2006.01)
(52) U.S. Cl.
    USPC .......................................... 714/763
(58) Field of Classification Search
    USPC .......................................... 714/763
    See application file for complete search history.

(56) References Cited

U.S. PATENT DOCUMENTS

| | | |
|---|---|---|
| 6,292,868 B1 | 9/2001 | Norman |
| 6,442,077 B2 | 8/2002 | Shin |
| 6,721,918 B2 | 4/2004 | Self et al. |
| 6,898,648 B2 | 5/2005 | LaBerge |
| 7,139,852 B2 | 11/2006 | LaBerge |
| 7,389,432 B2 | 6/2008 | Chandley et al. |
| 7,398,413 B2 | 7/2008 | Hampel et al. |
| 7,440,316 B1 | 10/2008 | Lee et al. |
| 7,501,963 B1 * | 3/2009 | Hollis .............................. 341/55 |
| 7,668,988 B2 | 2/2010 | Bertram |
| 7,701,368 B2 | 4/2010 | Hollis |
| 7,729,166 B2 | 6/2010 | Kim et al. |
| 8,127,204 B2 * | 2/2012 | Hargan ......................... 714/766 |
| 2005/0132112 A1 * | 6/2005 | Pawlowski ..................... 710/110 |
| 2005/0289435 A1 * | 12/2005 | Mulla et al. .................... 714/758 |
| 2007/0011379 A1 * | 1/2007 | Pawlowski ..................... 710/110 |
| 2013/0159818 A1 * | 6/2013 | O'Connor et al. ............. 714/799 |

FOREIGN PATENT DOCUMENTS

| | | |
|---|---|---|
| EP | 0444774 A2 | 9/1991 |
| JP | 8101813 A | 4/1996 |
| JP | 2004207942 A | 7/2004 |

OTHER PUBLICATIONS

Niizawa, et al. (Hitachi Cable) "JP8101813—Modulating and Demodulating Method for Data" Application No. JP19940237192 19940930 Publication date: Apr. 16, 1996, English Abstract, 2 pages.
Ueda, Hiroyuki (Sony Corp) "JP2004207942—Data Transfer Apparatus and Data Transfer Method" Application No. JP20020373685 20021225 Publication date: Jul. 22, 2004, English Abstract, 2 pages.

* cited by examiner

*Primary Examiner* — Amine Riad
(74) *Attorney, Agent, or Firm* — Katherine S. Brown; Jeffrey L. Streets

(57) ABSTRACT

In a memory system, a spare error correction bit is produced by processing data to be stored in sufficiently large chunks that the number of error correction bits required to protect each chunk are fewer than the available error correction signal lines on a memory bus and storage device. The spare bit is then used for an inversion bit in a parallel data bus inversion scheme, wherein data is selectively inverted to minimize bus switching. The transmission of data and error correction bits are spread over multiple phases, wherein parallel data bus inversion is applied to each phase. Alternatively, the transmission of data and error correction bits may be transmitted and stored in a single transaction. In either case, the spare bit is transmitted on a conventional memory bus and stored in a conventional memory module along with data and error correction bits.

21 Claims, 4 Drawing Sheets

DATA BUS INVERSION USING SPARE ERROR CORRECTION BITS

BACKGROUND

1. Field of the Invention

The present invention relates to computer system memory, and in particular to systems and methods for implementing parallel data bus inversion.

2. Background of the Related Art

Digital memory systems store information in binary form using logical 0s and 1s. A digital memory system includes a driver to generate time-dependent voltage signals that represent the different logic levels. The logic levels are interpreted at a receiver according to the voltage values received. The voltage of a signal may be compared with a reference voltage at the receiver to determine which logic states are being represented at each instance of a clock signal. The reliability of the signal is dependent on the voltage margin between the signal and the reference voltage. Some amount of noise is typically present in the channel, which affects the signal voltage.

As computer technology advances, processor speeds continue to increase, creating a demand for faster memory systems capable of keeping pace with the increasing processor speeds. Faster memory bus speeds are facilitated, in part, by reducing the voltages of I/O data signals, to avoid excessive transition time from one signal level to another. However, reducing the signal voltage also reduces the voltage margin between the signal voltage and the reference voltage with which the signal is compared. If the magnitude of the fixed reference voltage is not suitable, then the available voltage margin may be inadequate and result in reduced signal reliability.

Double Data Rate (DDR) memory is susceptible to noise problems, such as Inter Symbol Interference (ISI) and Simultaneous Switching Output (SSO) noise, which can cause reduced voltage margins and corrupted data. Such noise problems may be caused, in part, by package, connector, and circuit board parasitics. The power consumption of a memory system is also affected by bus switching, which is the alternating voltages in the bus signal line changes as the voltage levels between values of 0 and 1. Present technologies to combat these problems include 8/10b encoding of packet based memory and parallel data bus inversion. Conventionally, these methods require hardware modifications to both DDR DRAM (double data rate, dual random access memory) chips and memory controllers.

BRIEF SUMMARY

A first embodiment of the present invention is a method, wherein a complete set of error correction bits is generated for each chunk of data to be stored. Each chunk of data is transmitted on a memory bus to a storage device over multiple phases. The transmission of the error correction bits for the chunk of data are spread over the multiple phases. The data being transmitted in one or more of the phases is inverted, and an inversion bit is transmitted in each phase representing the inversion or non-inversion of the data in that phase. The transmitted inversion bit is stored together with the transmitted data and error correction bits of each phase in the storage device.

A second embodiment of the invention is a method, wherein a complete set of error correction bits are generated for each of a plurality of data chunks to be stored. The plurality of data chunks may be transmitted on a memory bus to a storage device over a sequence of transactions, each transaction including the transmission of all of the data and error correction bits for one of the chunks. The data being transmitted in one or more of the transactions may be inverted, and an inversion bit may be transmitted over the memory bus in each transaction representing the inversion or non-inversion of the data in that transaction. The transmitted inversion bit may be stored together with the transmitted data bits and error correction bits of each transaction in the storage device.

A third embodiment of the invention is a computer memory system that includes a memory bus, a memory controller, and a storage device. The memory bus includes a data path having a plurality of data signal lines and an error correction path having a plurality of error correction signal lines. The memory controller is configured for generating error correction bits for a selected chunk of data, transmitting the chunk of data and the error correction bits over multiple phases, and transmitting an inversion bit in each phase representing the inversion or non-inversion of the data in that phase. The storage device is coupled to the memory bus and is configured for storing the transmitted inversion bit together with the transmitted data and error correction bits transmitted by the memory controller in each phase.

In any of the above embodiments, a spare error correction bit may be used to transmit and store the inversion bit. Additionally, a hybrid error correction code (ECC) method is disclosed to ensure that the check bit changes polarity as well when the data is inverted.

DETAILED DESCRIPTION

Figure 1:
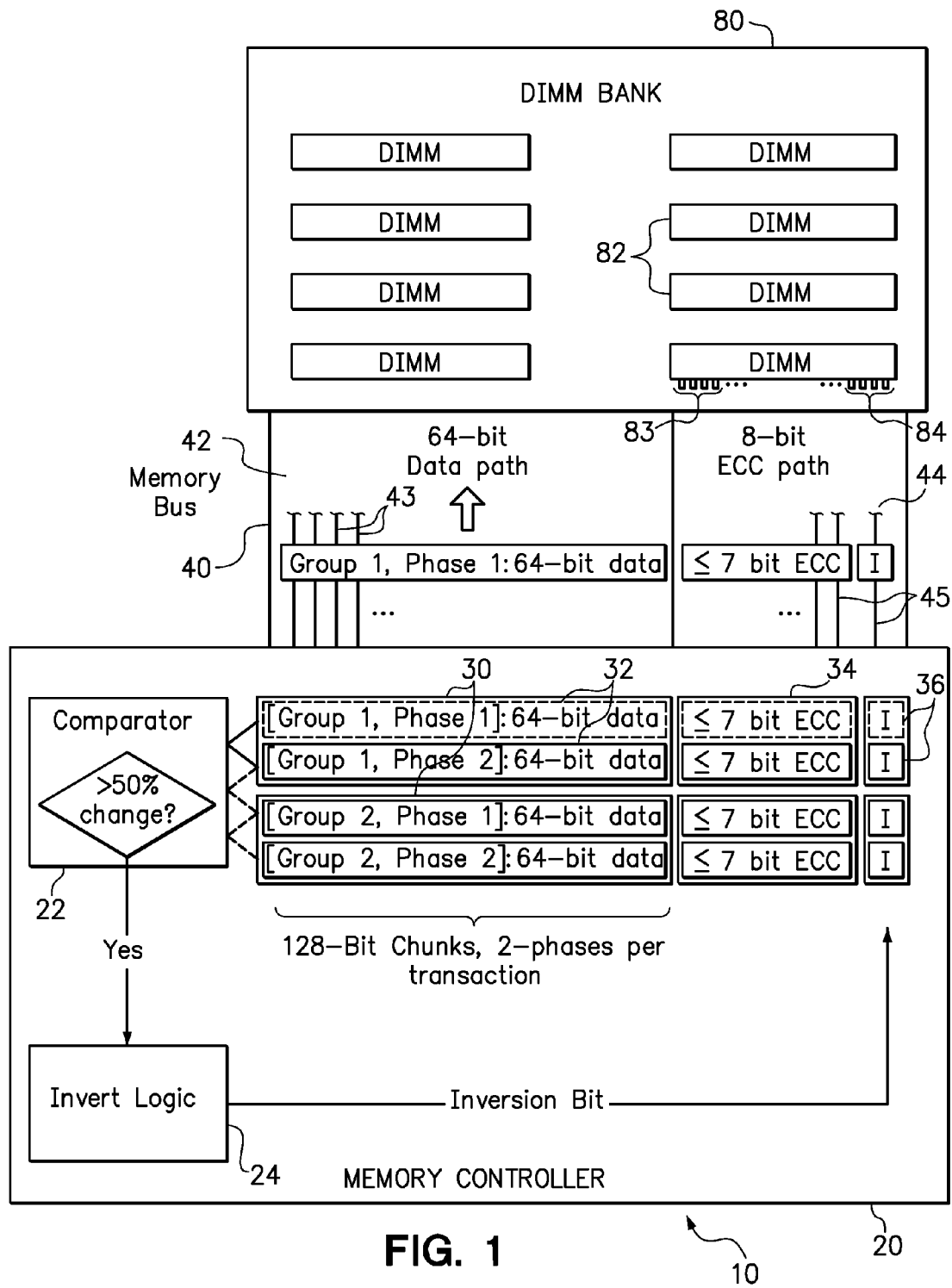
FIG. 1 is a schematic diagram of a computer memory system on which parallel data bus inversion may be performed on phases of a multiphase transaction according to an embodiment of the invention.

Embodiments of the invention include systems and methods for implementing parallel data bus inversion using standard, unmodified memory module and bus components. In a conventional error correction scheme, such as Hamming Single Error Correct, Double Error Detect (SECDED), the number of error correction ("ECC") bits required to protect a portion of data does not increase linearly with the number of data bits in that portion. For example, an error correction scheme that requires 8 ECC bits to protect a 64-bit chunk of memory data may require fewer than 16 ECC bits to protect a 128-bit chunk of data. Therefore, one of the disclosed features is to generate "spare" bits by transmitting memory on a memory bus using sufficiently large chunk of data that proportionally fewer ECC bits are required. The "spare bits" refer to both to signal lines in the memory bus and memory cells in the memory modules that are normally allocated to the transmission and storage of ECC bits. These spare bits may be re-allocated to the transmission and storage of inversion bits, instead. The inversion bits are used to apply a parallel data bus inversion for reducing ISI, SSO, and switching losses. The inversion bits may be transmitted directly on a conventional memory bus and stored directly in a conventional memory module.

One embodiment involves processing a chunk of data that is larger than the data path of a memory bus. ECC bits are generated for each chunk of the data. The transmission of each chunk is then spread across multiple phases of a multi-phase transaction to leave at least one spare bit for use as an inversion bit in one or more phase per chunk. Each phase may be considered a transaction in the sense that the phases are transmitted sequentially, except that multiple phases are required to transfer a single chunk in this embodiment, since the entire chunk will not fit on the memory bus using a single transaction. For example, a commonly available memory bus and DIMM have matching 64-bit data path and 8-bit ECC path. A memory controller may generate ECC bits for a chunk of data that is larger than the 64-bit data path, such as a 128-bit chunk of data. The 128-bit chunk may be protected using fewer than the 16 ECC total bits that would be available over two phases. For example, applying SECDED, only 9 ECC bits may be required to protect the 128-bit chunk. The memory controller may then transmit each 128-bit chunk of data in two 64-bit portions over two sequential phases, while spreading the transmission of the ECC bits over the two phases, such that there is one or more spare ECC signal line on the memory bus available for use as an inversion bit in one or more of the phases.

Parallel data bus inversion is then applied to the data transmitted in each phase, according to the inversion bit stored for the data of each phase. The comparison may be made between consecutive phases, such as between Phase 1 and Phase 2 of the same group, or between Phase 2 of one group and Phase 1 of the subsequent group. The values of the data bits in the currently transmitted phase are compared to the original values of the data in the next phase. If transmitting the original values of the data in the next phase would require more than a threshold number of the data bits to change from the values transmitted in the current phase, then the data transmitted in the next phase will be inverted, so that fewer than the threshold number of data bits will change. Typically, the threshold is 50% of the data bits. The value of the inversion bit in each phase represents the inversion or non-inversion of the data transmitted in that phase. The value of the inversion bit reflects the state of the data relative to its original state and not relative to the previous transaction.

In another embodiment, the data path of a memory bus (or the combined data path of multiple buses connected in parallel) is wide enough to transmit the entire chunk of data in a single transaction. A sufficient number of ECC signal lines are provided that one of the ECC signal lines may be used to transmit the spare ECC bit. For example, an entire 128-bit chunk may be transmitted on a memory bus having a 128-bit data path and a 16-bit ECC path, or in parallel on two memory buses each having a 64-bit data path and an 8-bit ECC path (for a combined 128-bit data path and 16-bit ECC path). Fewer than 16 ECC bits are required, however, so that at least one ECC signal line may be provided on the memory bus for use instead as an inversion bit in each transaction. Then, parallel data bus inversion is applied to consecutive 128-bit transactions, wherein each 128-bit transaction is compared with the next 128-bit transaction to determine which transactions to invert.

FIG. 1 is a schematic diagram of a computer memory system 10 on which parallel data bus inversion may be performed on phases of a multiphase transaction according to an embodiment of the invention. The memory system 10 includes a memory controller 20 in communication with a plurality of DIMMs (dual in-line memory modules) in a DIMM bank 80 over a memory bus 40. Components of the memory system 10 may be provided on a system board of a computer system, such as a server or a personal computer. The memory system 10 may be provided in any of a variety of different system configurations to control the flow of data between a processor and the DIMMs 82. Typically, the data will include computer executable program code and application data used in the execution of program code. The data is processed in 128-bit chunks 30. An error detection and correction scheme is applied to each chunk 30, and each chunk 30 is subdivided into 64-bit portions that are transmitted in a sequence of phases 32.

Errors in writing data include single-bit errors and multi-bit errors. In a single-bit error, one of the bits in an 8-bit word (a byte) is stored incorrectly. Single-bit errors are generally "soft" errors that are typically not repeated at a particular location. In a multi-bit error, a plurality of bits in a word are erroneous. Multi-bit errors are generally "hard" errors involving a hardware defect, such as a faulty memory location, that will cause repeat errors to occur at the same memory location. An error detection scheme generally involves generating additional bits used to identify errors in writing the data to the DIMMs 82. One of the more simple error detection schemes involves generating one additional check bit for every 8-bit word, which is used to detect (but not correct) a single-bit error. A common example of an error detection and correction scheme is Single Error Correct, Double Error Detect (SECDED). SECDED uses an extra byte (8 bits) per 64-bit word. Unless otherwise noted, it may be assumed that an SECDED scheme (adapted as indicated) is applied in the disclosed embodiments. However, one skilled in the art having the benefit of this disclosure will appreciate that alternative error detection and correction schemes that generate multiple ECC bits may alternatively be used.

The memory bus 40 used in this embodiment may be a conventional memory bus 40. The memory bus 40 is a parallel memory bus, which generally comprises a plurality of parallel signal lines used to carry electronic data signals in a computer system. The memory bus 40 in this embodiment specifically includes, by way of example, a 64-bit data path 42 having 64 data signal lines 43 and an 8-bit ECC path 44 comprising eight error correction signal lines 45. One of the error correction signal lines 45 may be used to transmit an inversion bit, as described herein. A 64-bit data path and 8-bit error correction path are one of the standard memory bus widths available for use in many current computer systems.

The DIMMs 82 may be conventional DIMMs commonly used in modern computer systems, and as such, do not require any hardware modifications in this embodiment. The DIMMs 82 are an example of a random access memory (RAM) storage device. Although a variety of different storage devices are within the scope of the invention, a DIMM 82 is currently the most commonly used type of RAM-based memory module in modern computer systems. Each specific type of DIMM is typically characterized by having a specific number of Dual Random Access Memory (DRAM) chips, having a particular spacing and stacking arrangement (if any). Each DIMM 82 may include, for example, multiples of nine DRAM chips, each including eight DRAM chips dedicated to data storage and one DRAM chip dedicated to ECC storage. Each type of DIMM known in the art also generally has a specific number of pins for handling data in a fixed-width data path. The DIMMs 82 may have, for example, a 64-bit data path and an 8-bit error correction path. DIMMs having a 64-bit data path are available in a variety of different pin configurations. Each DIMM 82 may be an ECC DIMM having seventy-two pins, including 64 data pins 83 and eight ECC pins 84.

The memory controller 20 is a digital circuit which manages the flow of data to and from the DIMM bank 80. The memory controller 20 may control the flow of data between a processor, such as a central processing unit (CPU), and the DIMM bank 80. The flow of data may include data input/output (I/O), including writing data to the DIMMs 82 and reading data from the DIMMs 82. The memory controller 20 is in electronic communication with the DIMM bank 80 over the memory bus 40. The memory controller 20 may be included with a chipset referred to as a Northbridge, separate from the CPU, wherein the memory bus 40 is the portion of a system bus between the Northbridge and the DIMM bank 80. Alternatively, the memory controller 20 may be incorporated within the microprocessor die of a CPU package, in which case the memory bus 40 may connect the CPU package to the DIMM bank 80.

The components of the memory system 10 are matched to provide data flow of a particular bit width. In this example, the memory controller 20 is a 64-bit memory controller for communication with the 64-bit DIMMs 82 over the 64-bit data path 42 of the memory bus 40. The memory controller 20 may transmit data to be stored in the DIMMs 82 in 64-bit words over the data path 42 of the memory bus 40, with each of the 64 bits being transmitted as a particular time-dependent voltage signal over a separate one of the parallel data signal lines 43. The memory controller 20 is also configured to generate ECC bits used for error detection and correction and transmit those ECC bits over the ECC path 44, in parallel with the 64-bit words of data.

The number of ECC bits required depends on the size of the chunk of data to which those ECC bits are applicable. Using SECDED, a 64-bit word typically requires eight ECC bits to protect, which would occupy all eight bits of the ECC path 44 using the illustrated bus 40. However, the number of ECC bits does not grow linearly with data size. Thus, for example, a 128-bit word requires fewer than sixteen (two times eight) ECC bits to protect, and a 256-bit words requires fewer than thirty-two (four times eight) ECC bits to protect. Therefore, the memory controller 20 processes data in sufficiently large chunks to generate spare bits. These spare bits are selectively allocated to the transmission of inversion bits to be used in a parallel data bus inversion scheme.

In the embodiment of FIG. 1, spare bits are generated by processing the data in chunks 30, wherein each chunk 30 is larger than the data path of the memory bus 40. Each chunk 30 is transmitted in a group of two phases 32. The sequence of groups to be transmitted is labeled Group 1, Group 2, etc., and the phases 32 of each group 30 are labeled Phase 1 and Phase 2. Each phase 32 includes the transmission of a portion of the data chunk sized to fit the data path 40. The transmission of each phase 32 is, in itself, a transaction, except that transmitting the entire chunk 30 of data in this embodiment requires multiple (two) phases 32. The ECC bits 34 are generated for the entire 128-bit chunk 30, but the transmission of the ECC bits 34 is spread over the multiple 64-bit phases 32. The ratio of ECC bits to data bits has been reduced by processing the larger data chunk 30 (as compared with a 64-bit chunk of data) such that all of the ECC bits generated for the data chunk 30 may be transmitted over the multiphase transaction, while leaving at least one spare ECC signal line 45 for transmitting an inversion bit 36. The data in one or more phase 32 is inverted, and the inversion bit 36 is set to represent the inversion or non-inversion of the data transmitted in that phase.

For each chunk 30, the data and ECC bits may be transmitted over a sequence of two 64-bit phases. Although a total of sixteen ECC bits are available over the two phases, fewer than sixteen ECC bits are required to fully protect each 128-bit data chunk. Specifically, a 128-bit chunk 30 may be protected using only 9 ECC bits. The nine ECC bits may be spread over the two phases 32. Depending on how the 9 ECC bits are spread over the two phases 32, spare bits may be available in one or both phases 32. One of those spare bits may be used as an inversion bit 36. The memory controller 20 transmits the 64-bit data portions sequentially as part of the multiphase transaction. In each phase, the memory controller 20 transmits the 64-bit data portion along the data path 42, along with some of the ECC bits (no greater than 7 ECC bits) and one inversion bit.

The diagram generally shows that in each phase 32, a total of eight ECC bits are available per phase 32. Since only 9 ECC bits are required per block 30, a total of 7 spare bits per block 30 are available. The ECC bits and remaining (spare) bits may be distributed in any of a variety of ways. As diagrammed, one inversion bit is transmitted per phase, which leaves a total of 7 or fewer ECC bits per phase that may be used for error correction. For example, the 9 ECC bits may be distributed among the two phases 32 with 5 ECC bits sent in Phase 1 and 4 ECC bits sent in Phase 2. This leaves 3 spare bits in Phase 1 and 4 spare bits in Phase 2, only one of which is needed as the inversion bit for each phase 32. Alternatively, the inversion bit for both phases may be transmitted together in a single phase. For example, the 9 ECC bits generated for a particular block 30 may be distributed with 1 ECC bit sent in Phase 1 and 8 ECC bits sent in Phase 2, leaving a total of 5 spare bits in Phase 1 and 0 spare bits in Phase 2.

The memory controller 20 includes a comparator 22 for comparing the data portion of the currently transmitted phase with the data portion of the next phase to determine how many data bits are to change in the next phase. If greater than a threshold number of the data bits are to change in the next phase relative to the value of the data bits in the current phase, then the memory controller applies inversion logic 24 to invert the values of the bits transmitted in the next phase. The threshold value is typically 50%. Thus, if more than half of the data bits in the next phase are to change relative to the values of those data bits (whether inverted or non-inverted) in the current phase, then the data in the next phase is instead inverted. Conversely, if fewer than half of the data bits in the next phase are to change relative to the value of those data bits in the current phase, then the data in the next phase is transmitted using the original values, i.e. non-inverted.

Inverting the data bits involves changing the original binary value of each data bit to the other binary value of the data bit. That is, inverting the data involves transmitting a logical "1" for each data bit having a logical "0" value, and transmitting a logical "0" for each data bit having a logical "1" value. The inversion bit 36 is then set to indicate the inversion or non-inversion of the data in each phase. For example, a "0" may be chosen to represent the non-inversion of data in a given phases, in which case a "1" represents the inversion of data in the given phase. This selective inversion of the data being transmitted minimizes the switching that occurs in the signal lines 43. Minimizing the switching in the signal lines 43 produces a lesser number of state transitions over the bus 40 from cycle to cycle, which saves power and reduces noise.

In the example of FIG. 1, Phase 1 is shown as the current phase, and Phase 2 is the next phase. The 64-bit data portion of Phase 1 is currently being transmitted on the 64-bit data path 42 of the memory bus 40. Meanwhile, the 64-bit data portion of Phase 2 is queued for transmission following the completion of Phase 1, such as on the next (or some subsequent) clock cycle. The comparator 22 compares the value of each of the 64 bits in Phase 2 to their values in Phase 2 in the present clock cycle. If greater than half (i.e. if greater than 32 bits) would change value then the data portion of Phase 2 is transmitted in an inverted state in the next (or some subsequent) clock cycle. Likewise, when Phase 2 becomes the current phase, the transmission of the data portion of Phase 2 (whether inverted or non-inverted) will be compared to the data portion of Phase 3 to determine whether to invert the data portion of Phase 3. When Phase 3 becomes the current phase, the transmission of the data portion of Phase 3 (whether inverted or non-inverted) will be compared to the data portion of Phase 4 to determine whether to invert the data portion of Phase 4.

The data bits, ECC bits 34, and inversion bits 36 are all stored together on the DIMMs 82. The inversion bits 36 may be stored together with the ECC bits 34 on ECC chips included with the DIMMs 82. The DIMMs 82 do not distinguish between ECC bits and inversion bits, as that distinction may be governed solely by the memory controller 20. The memory controller 20 tracks which bits are data bits, ECC bits and the inversion bit in each phase.

The memory controller 20 may subsequently retrieve the data bits, ECC bits, and inversion bits, and apply error correction to detect and correct any errors in the retrieved data according to the stored ECC bits. The stored data may also be retrieved in selected whole chunks. For example, the chunk 30 of data that was previously stored in two phases 32 may subsequently be retrieved in those two phases 32. The memory controller 20 may reference the stored inversion bits 36 to determine the original values of the data bits, so that data that was previously stored in an inverted state may be again inverted upon retrieval. For example, if an inversion bit set to 0 is used to indicate non-inversion of the data, then retrieved data for which the inversion bit is set to 0 may be sent in the retrieved state to an ECC decoder, while retrieved data for which an inversion bit is set to 1 may be inverted before sending to the ECC decoder. The ECC decoder may then reference the ECC bits to selectively detect and correct the retrieved data, as necessary.

It should be noted that parallel data bus inversion may again be applied upon retrieval of the data to minimize switching in the memory bus 40 as the retrieved memory is transmitted from the DIMMs 82 back to the memory controller 20. Assuming the data is retrieved in phases in the reverse or same order in which the phases 32 of the data were stored, then the data may be transmitted back to the memory controller in the same state in which it was original transmitted, since the stored inversion bits have already factored in the minimum switching required during bus transmission. Any retrieved data that had been stored in an inverted state on the DIMMs 82 may be re-inverted back to its original state at the memory controller 20, which is after the data has already been transmitted back over the memory bus 40. Then, any retrieved data that had been stored in an inverted state on the DIMMs 82 may be re-inverted back to its original state at the memory controller 20.

The storage and retrieval of the data, ECC, and inversion bits, and the selective inversion of the data, may therefore be governed entirely by the memory controller 20, without any active participation by the memory bus 40 or DIMMs 82. This feature allows a conventional memory bus and conventional DIMMs 82 to be used in the memory system to apply error, to reduce cost and increase compatibility of the memory controller 20 with existing or legacy systems.

Figure 2:
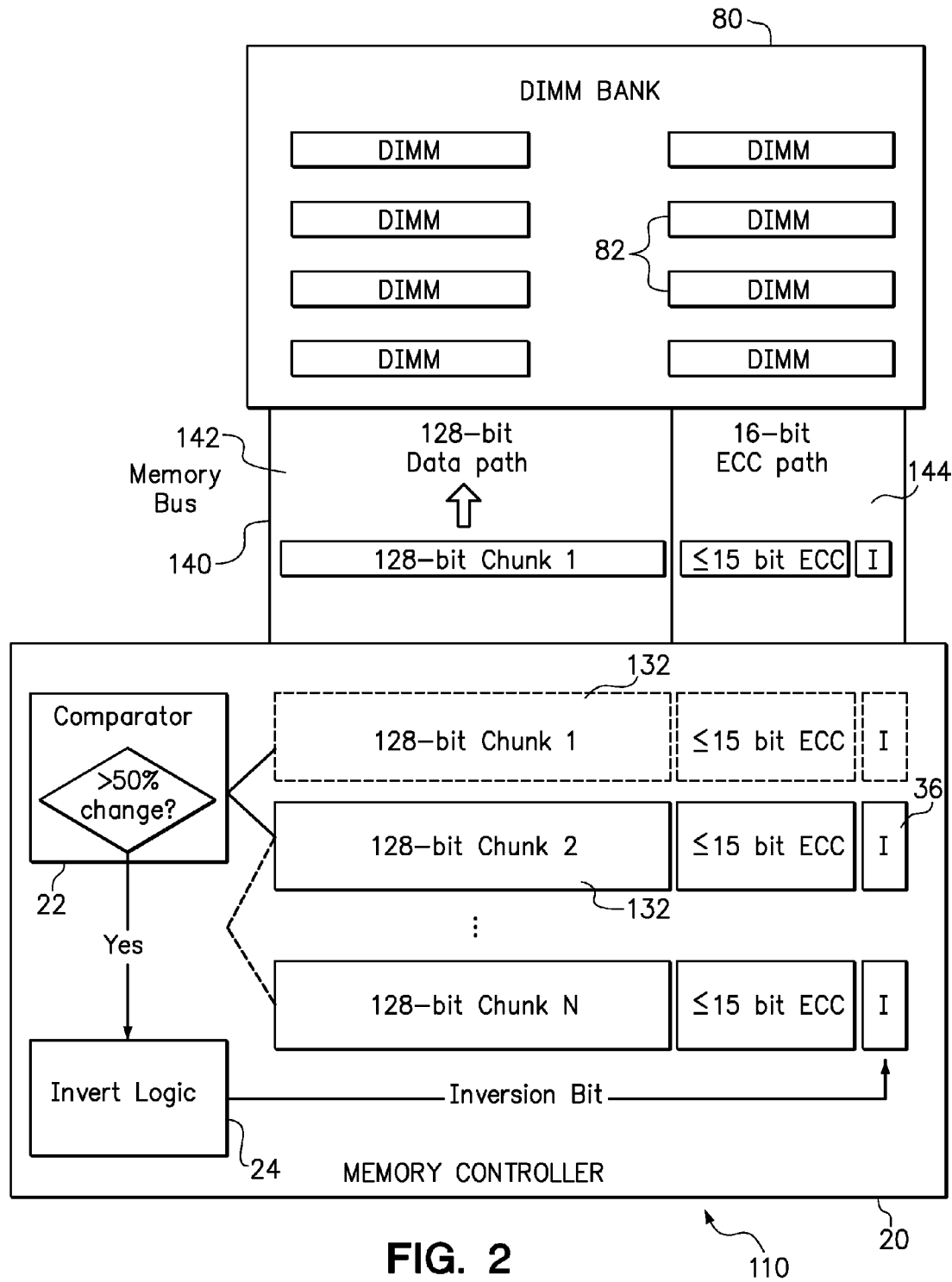
FIG. 2 is a schematic diagram of a computer memory system on which parallel data bus inversion may instead be performed on a sequence of "N" transactions according to another embodiment of the invention.

FIG. 2 is a schematic diagram of a computer memory system 110 on which parallel data bus inversion may be performed on a sequence of "N" transactions according to another embodiment of the invention. The memory bus 140 provided is wide enough for each chunk 132 to be transmitted in a single transaction. The memory bus 140 may consist of a single bus having a 128-bit data path 142 and a 16-bit ECC path 144. Alternatively, the memory bus 140 may include a plurality of memory buses connected in parallel between the memory controller 20 and the DIMM bank 80 and having a combined 128 signal lines and 32 ECC signal lines.

The DIMMs may again have a 64-bit data path, wherein the 128 data signal lines of the memory bus 140 are routed to the combined 128 bits of two DIMMs 82. Parallel data bus inversion may be performed in this embodiment on a sequence of transactions, wherein each transaction includes the transmission of all of the data bits and error correction bits for one of the 128-bit chunks 132. Because fewer than 16 ECC bits are required for protecting each 128-bit chunk 132, at least one spare error correction signal line is available on the memory bus in each transaction for the purpose of transmitting an inversion bit 36. Again, the transmitted inversion bit 36 may be stored together with the transmitted data and error correction bits of each transaction in the DIMM bank 80.

The chunks 132 of data are transmitted sequentially to the DIMMs 82. The data of each chunk 132 may be transferred in a single transaction in an inverted state or a non-inverted state. The comparator 22 compares the current transaction (which in the illustrated example is Chunk 1) to a next transaction (which in the illustrated example is Chunk 2). If greater than a threshold number of the data bits (e.g. greater than half of the data bits) are to change in the next transaction relative to their values being transmitted in the current transaction, then the data transmitted in the next transaction will be inverted and transmitted in the inverted state, along with a value of the inversion bit representing inversion of that data. Otherwise, the data transmitted in the next transaction will be inverted and transmitted in the original (non-inverted) state, along with a value of the inversion bit representing non-inversion of the data. As in the parallel data bus inversion of the sequence of phases in FIG. 1, the use of parallel data bus inversion to the sequence of transactions in FIG. 2 reduces bus switching, to reduce noise and power consumption.

The data stored in the DIMMs 82 may be subsequently retrieved, optionally applying parallel data bus inversion upon retrieval. Again, selected chunks of data stored in the DIMMs 82 may be retrieved from the DIMMs 82 along with the inversion bit associated with each selected transaction. Each chunk of data that was stored in an inverted state may be identified by an associated inversion bit representing the inversion of the data. At the memory controller 20, the previously inverted data may be restored to its original state. The inversion bit 136 associated with each chunk 132 may be tracked and toggled, as necessary, to perform the parallel data bus inversion and to keep track of whether the data of any particular chunk is represented in its original or complementary state.

Figure 3:
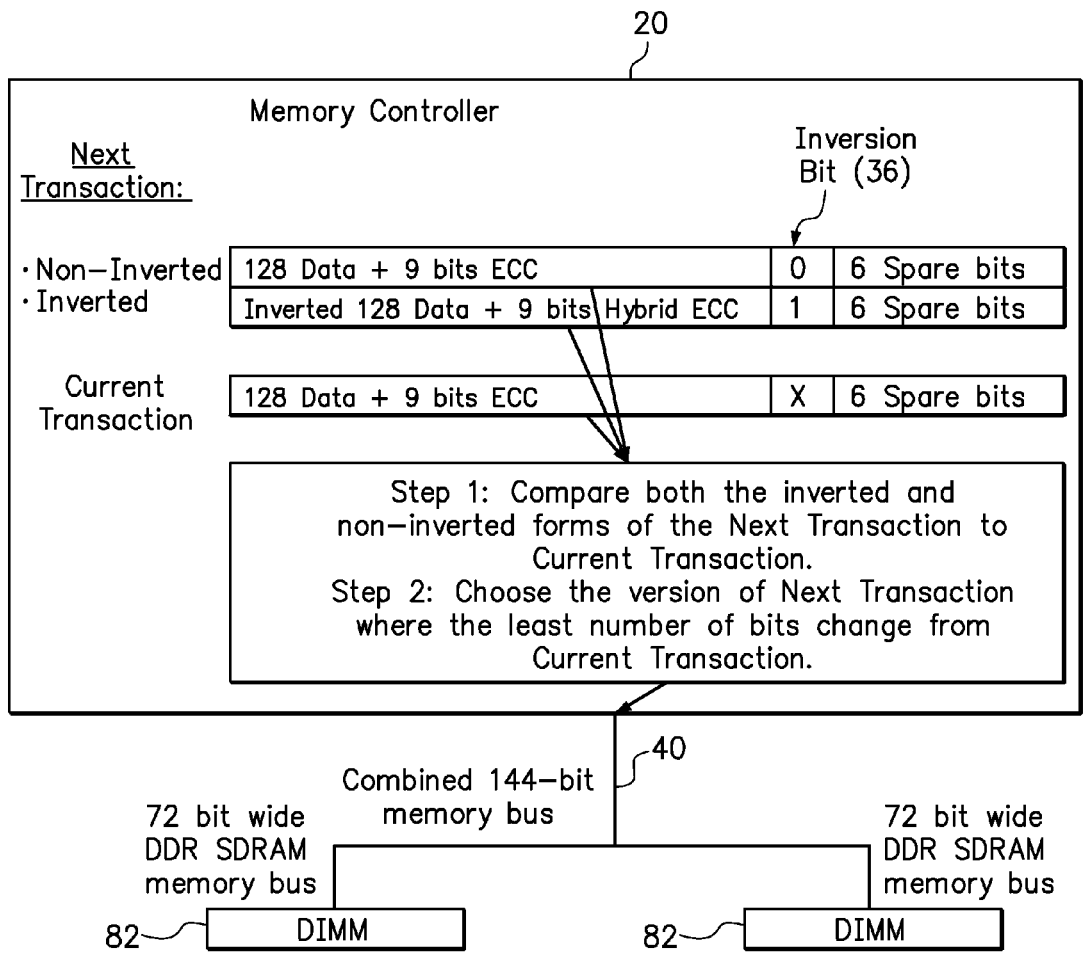
FIG. 3 is a schematic bit flow diagram in a single-write (one-phase) transaction providing an additional layer of data protection in which error correction and detection is applied both to the data bits and to the inversion bit.

FIG. 3 is a schematic bit flow diagram in a single-write (one-phase) transaction providing an additional layer of data protection in which error correction and detection is applied both to the data bits and to the inversion bit. The discussion of FIGS. 1 and 2 assumed that the ECC bits generated applied only to the data of each phase, and not to the inversion bit. An error in the inversion bit can also be a source of data error. For example, an erroneous inversion bit may falsely indicate that data stored in its original (non-inverted) state is actually in the inverted state, causing the system to mistakenly invert the retrieved data. Likewise, an erroneous inversion bit may falsely indicate that data in an inverted state is already in its original state, causing the system to mistakenly fail to re-invert the retrieved data. By contrast, applying error correction and detection also to the inversion bit, as shown in FIG. 3, ensures that the retrieved data is in the correct state (and not the inverse of the retrieved data).

FIG. 3 shows 128-bit data transactions, with 9 ECC bits, 1 inversion bit, and 6 spare bits per transaction. In FIGS. 1 and 2, the inversion bit was solely based on a comparison between the current transaction and the non-inverted data of the next transaction. In FIG. 3, Step 1, the current transaction is instead compared to both the inverted and non-inverted forms of the next transaction. In Step 2, the inverted or non-inverted form of the next transaction is then chosen to minimize the number of bits change on the memory bus from the current transaction to the next transaction. Whether the ECC bits are also inverted if the data is inverted depends on the number of data bits that are covered by each of the ECC check bits. For example, if an ECC check bit covers an even number of data bits, the check bit will not invert when the data is inverted. Likewise, if the number of bits covered is odd, the check bit will invert when the data is inverted. The number of bits covered by each check bit depends on the length of the data-word being protected. This approach ensures that the true (original) and complemented (inverted) versions of the transaction are different in each bit location. Without this approach, some of the ECC bits may remain the same for the true and complemented versions.

Figure 4:
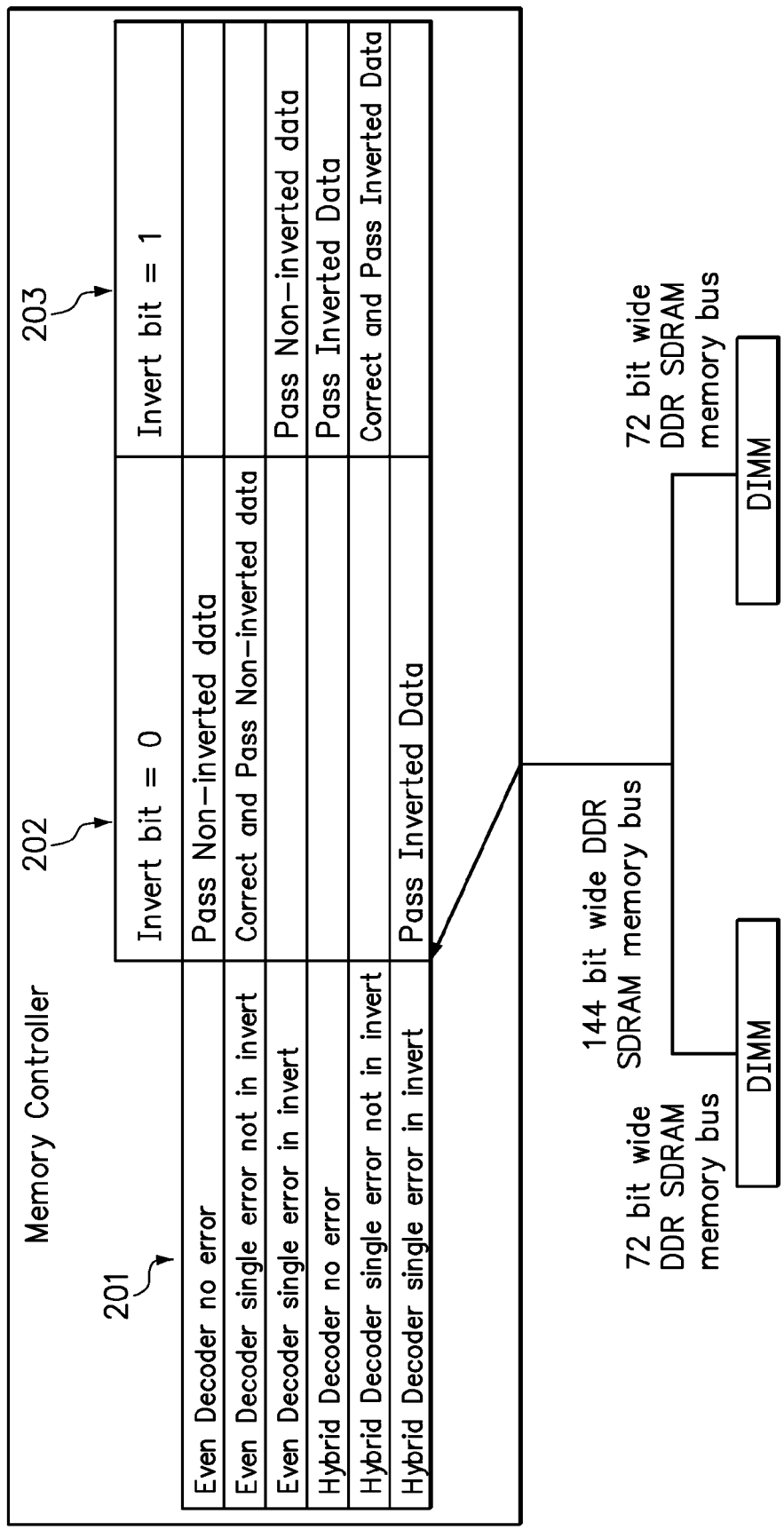
FIG. 4 is a chart illustrating the application of the hybrid ECC approach on a single-read transaction.

To ensure that the true and complemented versions of the transaction are different in each bit location, a "hybrid ECC" approach may be followed. Generally, SEC (single error correct) ECC works by having each data bit incorporated into two different parity checks. The data bit positions that are incorporated into the parity checks are defined by a Hamming code. The parity checks can be either even (i.e., the sum of 1s in the parity word is an even number) or odd (i.e., the sum of 1s in the parity word is an odd number). The parity word includes the data bits plus the parity bit. The parity is calculated by first determining if the data bits in the parity word are odd or even. Then, the parity bit is set to ensure that the entire parity word complies with the even or odd requirement. ECC usually involves selecting one parity method for all the check bits. For the hybrid method disclosed herein, different parity methods are chosen depending on the status of the invert bit. The hybrid ECC protection may be applied using two rules. Rule 1 may be stated as, "for all parity bits covering an even number of bits perform odd parity." Rules 2 may be stated as, "for all parity bits covering an odd number of bits perform even parity." According to the above rules, therefore, if the invert bit is '0' then all standard even parity is used. If the invert bit is '1' then the hybrid parity is used. This change ensures that the check bits change as well. If even parity was used when the invert bit was a '1', for the parity words that contain an even number of bits, the parity bit would stay the same when the data bits were inverted. By changing the parity behavior for these parity words to odd, we ensure that the check bit changes polarity as well. Similar rules could be applied for other error encoding schemes as well. FIG. 4 is a chart illustrating the application of the hybrid ECC approach on a single-read transaction. A first column 201 lists the possible scenarios of data retrieval. The respective outcomes of these scenarios are listed in columns 202 and 203.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the invention.

The corresponding structures, materials, acts, and equivalents of all means or steps plus function elements in the claims below are intended to include any structure, material, or act for performing the function in combination with other claimed elements as specifically claimed. The description of the present invention has been presented for purposes of illustration and description, but it is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method, comprising:
generating a complete set of error correction bits for each chunk of data to be stored;
transmitting each chunk of data on a memory bus to a storage device over multiple phases and spreading the transmission of the error correction bits for the chunk of data over the multiple phases;
inverting the data being transmitted in one or more of the phases;
transmitting an inversion bit in each phase representing the inversion or non-inversion of the data in that phase; and
storing the transmitted inversion bit together with the transmitted data and error correction bits of each phase in the storage device.

2. The method of claim 1, further comprising:
leaving a spare error correction signal line on the memory bus in one or more of the phases per chunk; and
transmitting the inversion bit over the spare error correction signal line.

3. The method of claim 1, further comprising:
retrieving the data stored in selected phases from the storage device along with the inversion bit associated with each selected phase;
retrieving the data without inverting the data for each phase having an associated inversion bit representing the non-inversion of the data; and
inverting the retrieved data for each phase having an associated inversion bit representing the inversion of the data.

4. The method of claim 1, wherein the step of inverting the data being transmitted in one or more of the phases further comprises:
transmitting the data of a current phase in an inverted or non-inverted state;
if greater than a threshold number of the data bits are to change in a next phase relative to their values being transmitted in the current phase, then inverting the data transmitted in the next phase along with a value of the inversion bit representing inversion of that data.

5. The method of claim 1, wherein the storage device comprises a bank of dual in-line memory modules including a plurality of random access memory chips allocated for storage of the data and at least one memory chip allocated for storage of the error correction bits, wherein the inversion bit is stored on the memory chip allocated for storage of the error correction bits.

6. The method of claim 1, further comprising generating the error correction bits to protect both the data and the associated inversion bit in each phase.

7. The method of claim 6, further comprising:
applying a hybrid ECC protection, including performing odd parity for all parity bits covering an even number of bits and performing even parity for all parity bits covering an odd number of bits.

8. A method, comprising:
generating a complete set of error correction bits for each of a plurality of data chunks to be stored;

transmitting the chunks of data on a memory bus to a storage device over a sequence of transactions, each transaction including the transmission of all of the data and error correction bits for one of the chunks;
inverting the data being transmitted in one or more of the transactions; and
transmitting an inversion bit over the memory bus in each transaction representing the inversion or non-inversion of the data in that transaction; and
storing the transmitted inversion bit together with the transmitted data bits and error correction bits of each transaction in the storage device.

9. The method of claim 8, further comprising:
transmitting the chunks of data on a single memory bus having sufficient data signal lines to transmit the entire chunk of data in each transaction and sufficient error correction signal lines to transmit the entire set of error correction bits for each transaction while leaving at least one spare error correction signal line on the memory bus in each transaction; and
transmitting the inversion bit on the spare error correction signal line in each transaction.

10. The method of claim 8, further comprising:
transmitting the chunks of data over the combined data signal lines of a plurality of memory buses in parallel, wherein the combined data signal lines of the memory buses are sufficient to transmit the entire chunk of data in each transaction and the combined error correction signal lines are sufficient to transmit the entire set of error correction bits for each transaction with at least one spare error correction signal line on the memory bus in each transaction; and
transmitting the inversion bit on the spare error correction signal line in each transaction.

11. The method of claim 10, further comprising:
retrieving the data stored in selected transactions from the storage device along with the inversion bit associated with each selected transaction;
retrieving the data without inverting the data for each transaction having an associated inversion bit representing the non-inversion of the data; and
inverting the retrieved data for each transaction having an associated inversion bit representing the inversion of the data.

12. The method of claim 11, wherein the step of inverting the data being transmitted in one or more of the transactions further comprises:
transmitting the data of a current transaction in an inverted or non-inverted state;
if greater than a threshold number of the data bits are to change in a next transaction relative to their values being transmitted in the current transaction, then inverting the data transmitted in the next transaction along with a value of the inversion bit representing inversion of that data.

13. The method of claim 10, further comprising generating the error correction bits to protect both the data and the associated inversion bit in each transaction.

14. The method of claim 13, further comprising:
applying a hybrid ECC protection, including performing odd parity for all parity bits covering an even number of bits and performing even parity for all parity bits covering an odd number of bits.

15. A computer memory system, comprising:
a memory bus including a data path having a plurality of data signal lines and an error correction path having a plurality of error correction signal lines; and
a memory controller configured for generating error correction bits for a selected chunk of data, transmitting the chunk of data and the error correction bits over multiple phases, and transmitting an inversion bit in each phase representing the inversion or non-inversion of the data in that phase; and
a storage device coupled to the memory bus and configured for storing the transmitted inversion bit together with the transmitted data and error correction bits transmitted by the memory controller in each phase.

16. The computer memory system of claim 15, wherein the memory controller further comprises control logic for retrieving the data stored in selected phases from the storage device along with the inversion bit associated with each selected phase, including retrieving the data without inverting the data for each phase having an associated inversion bit representing the non-inversion of the data and inverting the retrieved data for each phase having an associated inversion bit representing the inversion of the data.

17. The computer memory system of claim 15, wherein the memory controller further comprises control logic for leaving at least one spare error correction signal line on the memory bus in each phase, inverting the data being transmitted in one or more of the phases, and transmitting the inversion bit over the spare error correction signal line.

18. The computer memory system of claim 17, wherein the memory controller further comprises control logic for generating the error correction bits for the entire chunk of data as a whole and to spread the transmission of the error correction bits over the multiple phases such that the spare error correction signal line is left on the memory bus in each phase.

19. The computer memory system of claim 17, wherein the memory controller further comprises control logic for generating the error correction bits for the data in each phase, and wherein the bus includes sufficient error correction signal lines for transmitting all of the error correction bits in each phase with the at least one spare signal line remaining for transmitting the inversion bit.

20. The computer memory system of claim 15, wherein the memory controller is further configured to transmit the data of a current phase in an inverted or non-inverted state and, if greater than a threshold number of the data bits are to change in a next phase relative to their values being transmitted in the current phase, then to invert the data transmitted in the next phase along with a value of the inversion bit representing inversion of that data.

21. The computer memory system of claim 15, wherein the storage device comprises a bank of conventional dual in-line memory modules, each conventional dual in-line memory module including a plurality of random access memory chips allocated for storage of the data and at least one memory chip allocated for storage of the error correction bits, wherein the memory controller generates the inversion bit such that it is stored together with the error correction bits in the error correction chip.

* * * * *